United States Patent
Wilson et al.

(10) Patent No.: US 11,584,450 B2
(45) Date of Patent: Feb. 21, 2023

(54) VEHICLE TAILGATE SECURING ASSEMBLY AND METHOD

(71) Applicant: Ford Global Technologies, LLC, Dearborn, MI (US)

(72) Inventors: Edward Wilson, Livonia, MI (US); Jessica Lee Dzurnak, Ferndale, MI (US); Michael J. Gardynik, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 62 days.

(21) Appl. No.: 17/124,548

(22) Filed: Dec. 17, 2020

(65) Prior Publication Data
US 2022/0194490 A1 Jun. 23, 2022

(51) Int. Cl.
*B62D 33/027* (2006.01)
*B62D 33/033* (2006.01)
*B62D 65/06* (2006.01)
*B62D 33/03* (2006.01)

(52) U.S. Cl.
CPC ......... *B62D 33/0273* (2013.01); *B62D 33/03* (2013.01); *B62D 65/06* (2013.01)

(58) Field of Classification Search
CPC .............. B62D 33/033; B62D 33/0273; B62D 33/023; B62D 33/03; B62D 33/027; B62D 65/06; B60R 25/00; B60R 25/01; B60J 5/0498; B60J 5/108; E05B 74/44; E05B 79/04; E05D 11/0018; Y10T 74/219; Y10T 74/2063; Y10T 292/509; Y10T 70/454
USPC .......................................................... 74/526
See application file for complete search history.

(56) References Cited

U.S. PATENT DOCUMENTS

| | | | | |
|---|---|---|---|---|
| 5,415,058 A | * | 5/1995 | Young | B60R 25/00 70/237 |
| 5,823,022 A | * | 10/1998 | Barker | B62D 33/0273 70/164 |
| 5,857,738 A | * | 1/1999 | Hamilton | B62D 33/0273 296/57.1 |
| 10,293,868 B2 | | 5/2019 | Jergess et al. | |
| 2006/0220409 A1 | * | 10/2006 | Smith | B62D 33/0273 296/57.1 |
| 2007/0096492 A1 | * | 5/2007 | Austin | E05D 11/084 296/57.1 |
| 2008/0252094 A1 | * | 10/2008 | Schulte | B62D 33/0273 296/57.1 |
| 2009/0302630 A1 | * | 12/2009 | Duffy | E05F 1/123 296/57.1 |
| 2013/0278004 A1 | * | 10/2013 | Sackett | B62D 33/0273 296/57.1 |
| 2016/0304134 A1 | | 10/2016 | Boesel et al. | |

(Continued)

OTHER PUBLICATIONS

US 10,111,931 B2, 11/2018, Higgins et al. (withdrawn)

*Primary Examiner* — Gregory A Blankenship
(74) *Attorney, Agent, or Firm* — Vichit Chea; Carlson, Gaskey & Olds, P.C.

(57) ABSTRACT

An assembly for securing a tailgate to a cargo bed includes, among other things, a strap having a first leg spaced from a second leg, and a fastener moveable to an engaged position with the strap. The fastener in the engaged position extends through a first aperture in the first leg to threadably engage a second aperture in the second leg. When the fastener is in the engaged position, the fastener and the strap are configured to secure a tailgate to a cargo bed.

10 Claims, 4 Drawing Sheets

(56) References Cited

U.S. PATENT DOCUMENTS

| | | | |
|---|---|---|---|
| 2017/0274869 A1 | 9/2017 | Da Deppo et al. | |
| 2017/0370132 A1* | 12/2017 | Da Deppo | E05B 81/16 |
| 2018/0229779 A1* | 8/2018 | Jergess | B62D 33/0273 |
| 2020/0047821 A1* | 2/2020 | Santana | E05F 15/614 |
| 2020/0087962 A1* | 3/2020 | Trentin | B62D 33/0273 |
| 2020/0399943 A1* | 12/2020 | Ulewicz | B62D 33/0273 |
| 2021/0371017 A1* | 12/2021 | Heins | B62D 33/0273 |
| 2022/0194490 A1* | 6/2022 | Wilson | B62D 33/0273 |

\* cited by examiner

VEHICLE TAILGATE SECURING ASSEMBLY AND METHOD

TECHNICAL FIELD

This disclosure relates generally to securing a tailgate to inhibit removal of the tailgate.

BACKGROUND

Vehicles, such as pickup trucks, can include a cargo bed. A tailgate can enclose one end of the cargo bed when the tailgate is in a closed position. The tailgate can pivot from the closed position to a fully open position where the tailgate is substantially horizontal. Some tailgates can be held by cables in a secondary position between a fully open position and a closed position.

SUMMARY

An assembly for securing a tailgate to a cargo bed according to an exemplary aspect of the present disclosure includes, among other things, a strap having a first leg spaced from a second leg, and a fastener moveable to an engaged position with the strap. The fastener in the engaged position extends through a first aperture in the first leg to threadably engage a second aperture in the second leg. When the fastener is in the engaged position, the fastener and the strap are configured to secure a tailgate to a cargo bed.

In another example of the foregoing assembly, the strap is a U-shaped strap.

In another example of any of the foregoing assemblies, the tailgate pivots about a pivot axis between a closed position and an open position relative to the cargo bed. The strap and the fastener together extend circumferentially continuously about the pivot axis when the fastener is in the engaged position.

In another example of any of the foregoing assemblies, the first leg and the second leg are spaced a distance from each other when the fastener is in the engaged position such that no portion of the first leg contacts the second leg when the fastener is in the engaged position.

In another example of any of the foregoing assemblies, the fastener spans across the distance from the first leg to the second leg when the fastener is in the engaged position.

Another example of any of the foregoing assemblies includes a pivot pin held within a cupped member to pivotably couple the tailgate to the cargo bed. The pivot pin rotates within the cupped member when the tailgate pivots back and forth between an open position and a closed position. The strap and the fastener circumferentially surround the cupped member to secure the tailgate to the cargo bed.

In another example of any of the foregoing assemblies, the cupped member includes an opening. The pivot pin is moved radially inward relative to the pivot axis through the opening to position the pivot pin within the cupped member.

In another example of any of the foregoing assemblies, when the fastener is in the engaged position, a shaft of the fastener is configured to directly contact the cupped member.

In another example of any of the foregoing assemblies, the strap includes an anti-rotation feature that extends radially inward into a portion of the opening. The anti-rotation feature can be configured to align the strap to the cupped member and configured to limit rotation of the strap about the pivot axis.

In another example of any of the foregoing assemblies, the first leg is spaced a distance from the second leg. A diameter of the cupped member is greater than the distance such that the first leg is moved away from the second leg when the strap is placed over the cupped member.

In another example of any of the foregoing assemblies, the cupped member extends from a bracket that is directly secured to a sidewall of the cargo bed.

A tailgate securing method according to another exemplary aspect of the present disclosure includes, among other things, pivotably coupling a tailgate to a cargo bed by moving a pivot pin radially through an opening of a cupped member to position the pivot pin within the cupped member. The tailgate is configured to pivot about a pivot axis relative to the cargo bed when the pivot pin is within the cupped member. The method further includes placing a strap over the cupped member. The strap blocks radial movement of the pivot pin back through the opening. The strap extends partially about the pivot axis. The method still further includes transitioning a threaded fastener to an engaged position with the strap. The threaded fastener extends partially about the pivot axis when in the engaged position such that the threaded fastener and the strap together circumferentially surround the pivot axis.

In another example of the foregoing method, the strap has a first leg spaced from a second leg. The threaded fastener extends through a first aperture in the first leg and threadably engages a second aperture in the second leg when the threaded fastener is in the engaged position.

In another example of any of the foregoing methods, a distance between the first leg and the second leg is greater than a distance between the first leg and the second leg such that placing the strap over the cupped member moves the first leg away from the second leg.

In another example of any of the foregoing methods, the strap is a U-shaped strap.

In another example of any of the foregoing methods, a portion of the strap extends radially into the opening of the cupped member when the threaded fastener is in the engaged position with the strap and the strap is placed over the cupped member.

In another example of any of the foregoing methods, when the fastener is in the engaged position, a shaft of the fastener is configured to directly contact the cupped member.

In another example of any of the foregoing methods, the cupped member extends from a bracket that is directly secured to a sidewall of the cargo bed.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary assembly and method for securing a tailgate of a vehicle to a cargo bed of a vehicle. The assembly used to secure the tailgate is relatively simple and inexpensive.

Figure 1:
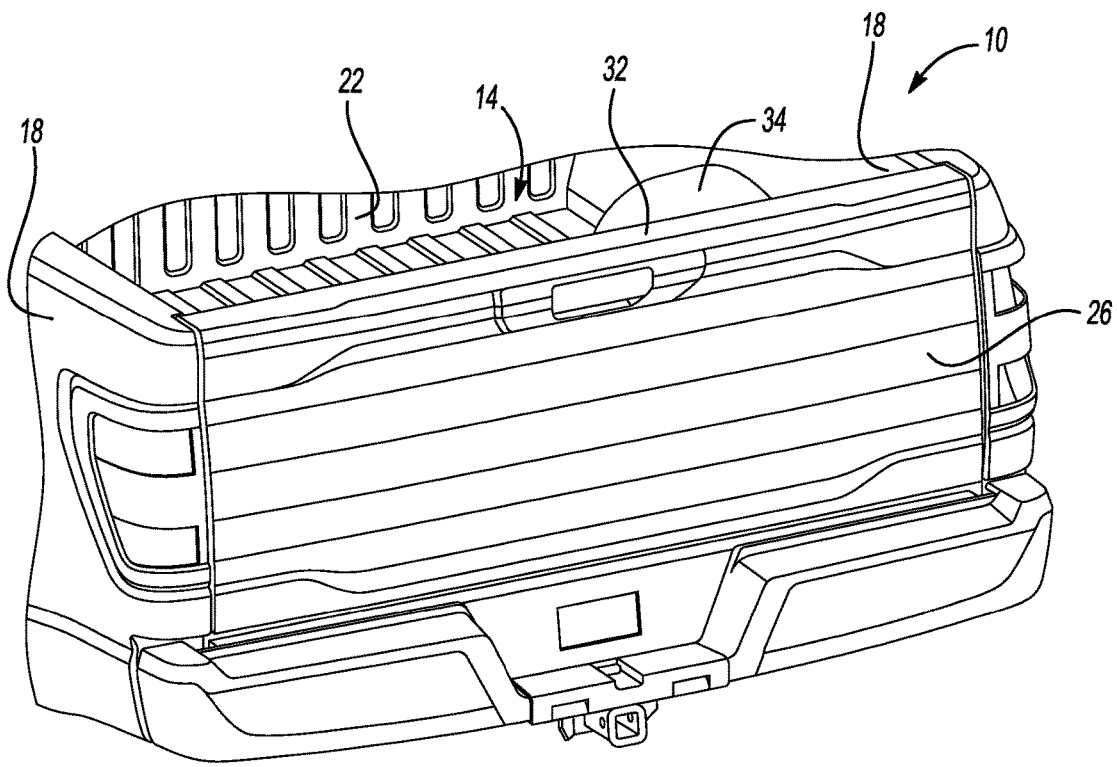
FIG. 1 illustrates a rear perspective view of a vehicle having a cargo bed and a tailgate in a closed position according to an exemplary aspect of the present disclosure.
Figure 2:
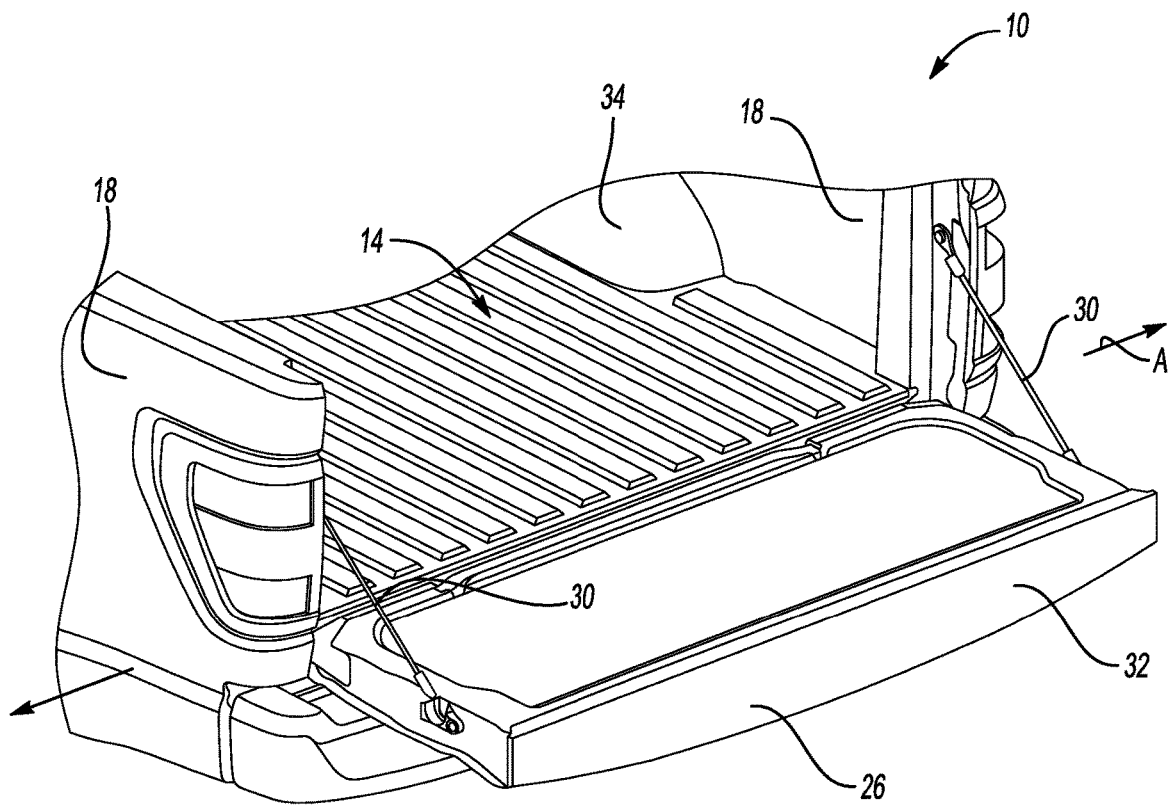
FIG. 2 illustrates the rear perspective view of the vehicle of FIG. 1 when the tailgate is in a fully open position.
Figure 3A:
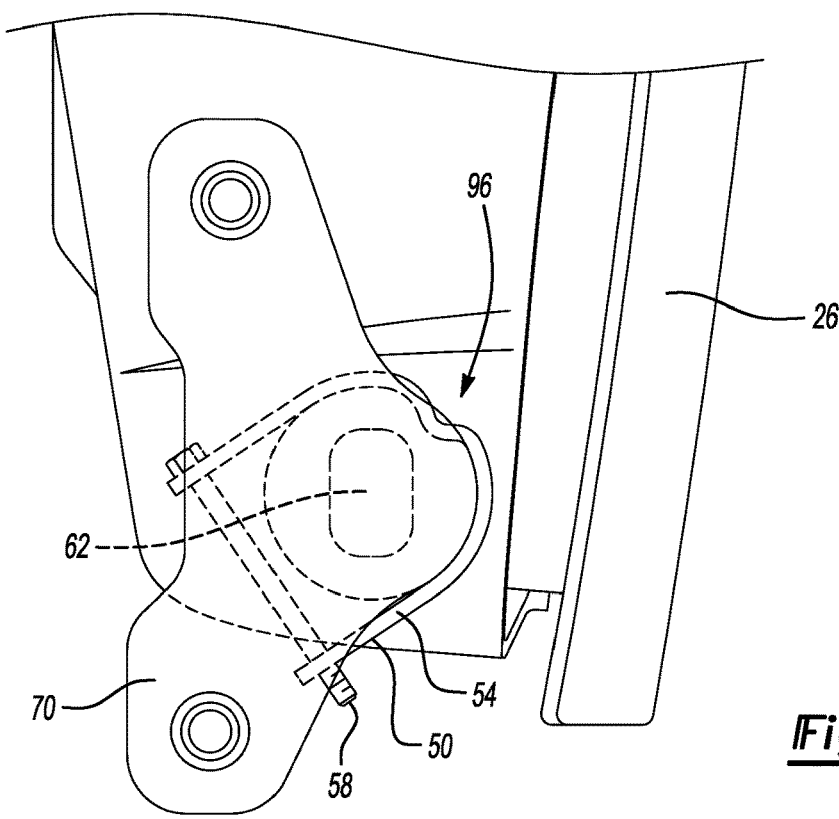
FIG. 3A illustrates a side view of portions of the tailgate of FIG. 1 in a closed position along with a securing assembly that secures the tailgate to the cargo bed of FIG. 1.
Figure 3B:
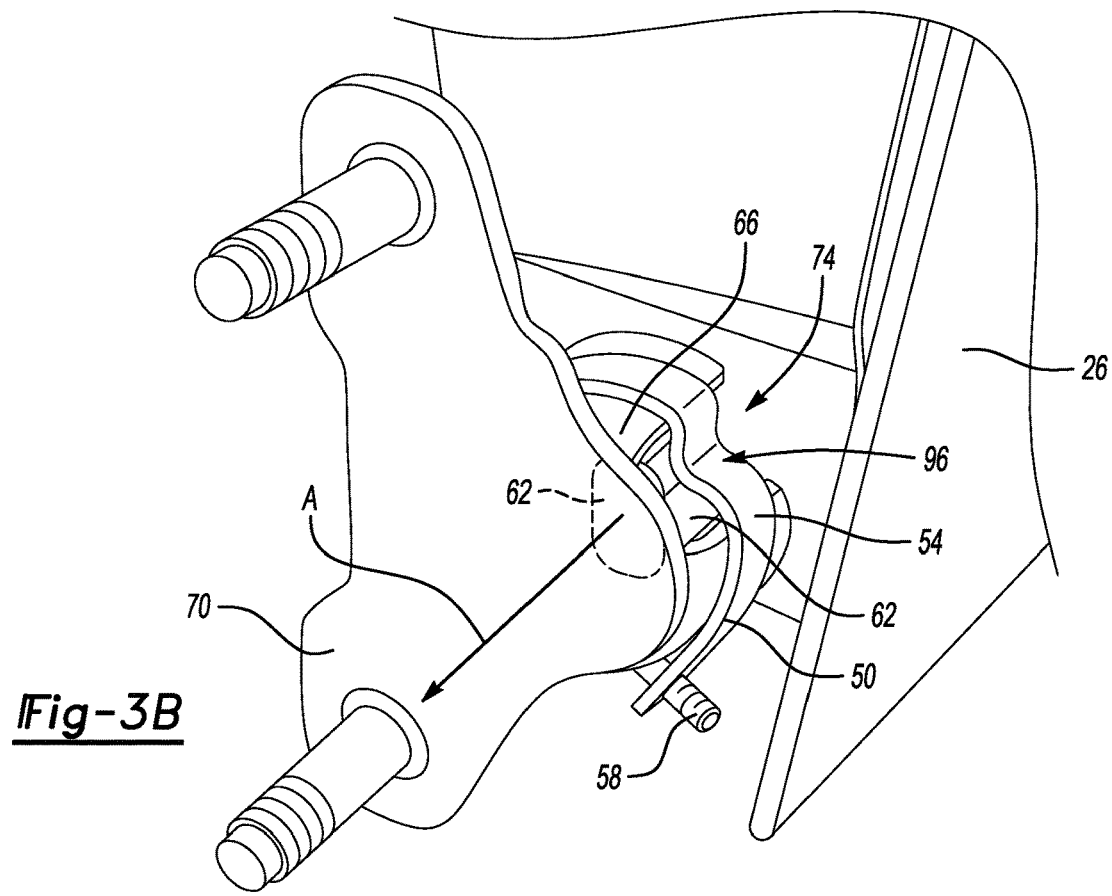
FIG. 3B illustrates a perspective view of the portions of the tailgate and the securing assembly shown in FIG. 3A.
Figure 4A:
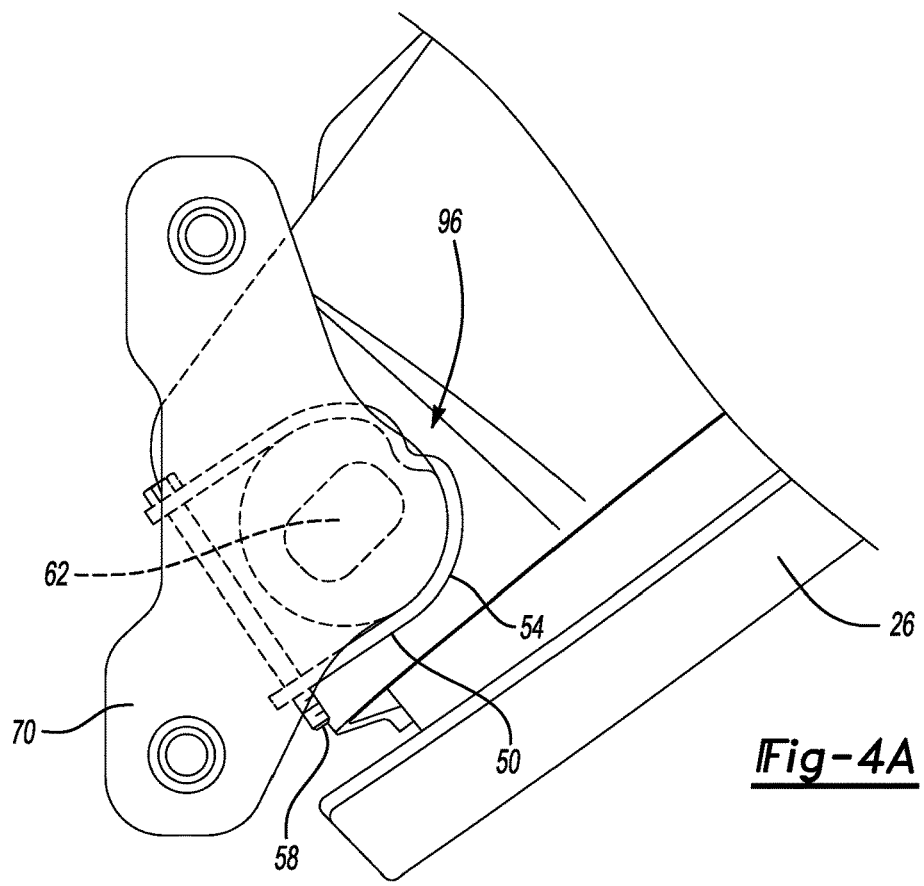
FIG. 4A illustrates a side view of portions of the tailgate of FIGS. 3A and 3B in a secondary position along with the securing assembly.
Figure 4B:
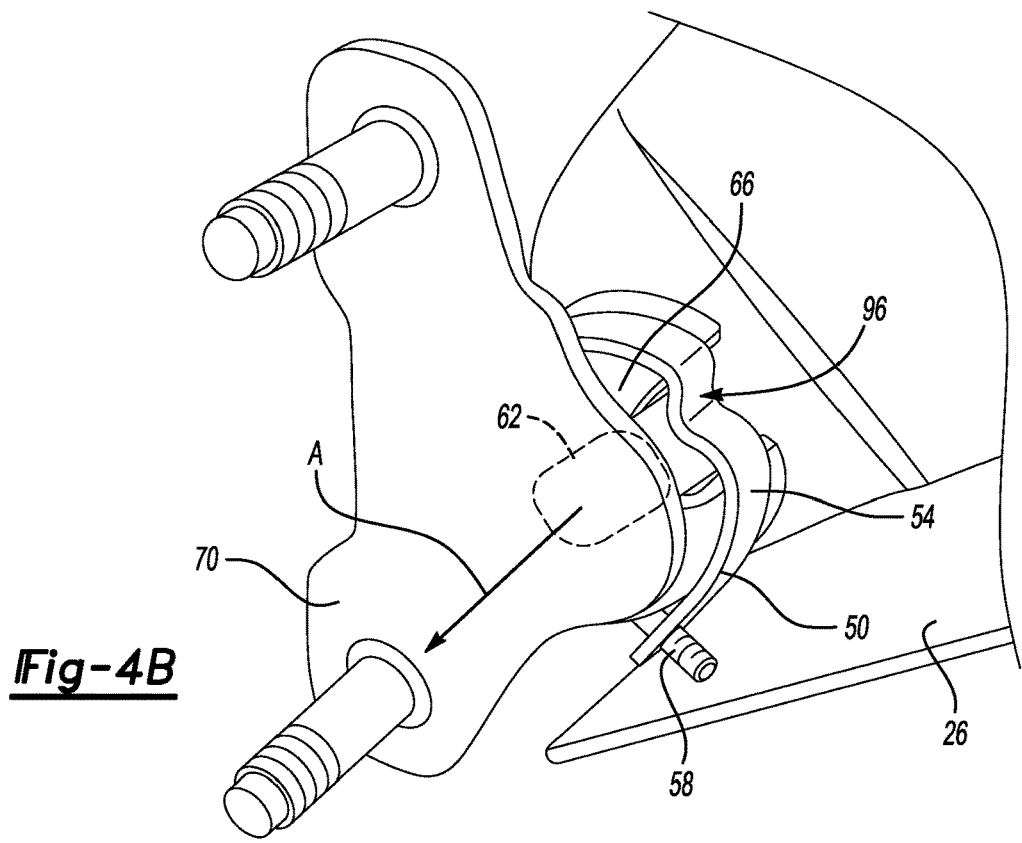
FIG. 4B illustrates a perspective view of the portions of the tailgate and the securing assembly shown in FIG. 4A.

FIGS. 1 and 2 illustrate a vehicle 10, here, a pickup truck, having a cargo bed 14 that is defined by a pair of sidewalls 18, a front wall 22, and a tailgate 26 according to an exemplary aspect of the present disclosure.

The tailgate 26 is pivotable about a pivot axis A between a closed position, shown in FIG. 1, and a fully open position, shown in FIG. 2. The example tailgate 26 is vertically aligned when in the closed position and horizontally aligned when in the fully open position. Vertical and horizontal, for purposes of this disclosure, are with reference to ground and the ordinary orientation of the vehicle during operation.

Cable devices 30 provide a tailgate support system that helps to support the tailgate 26 when in the fully open position. The exemplary tailgate support system includes two cable devices 30—one on a passenger side and one on a driver side of the vehicle 10.

The tailgate 26 can be moved to a secondary position (not show), which is between the closed position of FIG. 1 and the fully open position of FIG. 2. A user may adjust the cable devices 30 so that the cable devices 30 can hold the tailgate 26 in the secondary position.

In an exemplary embodiment, the tailgate 26 can be placed in the secondary position to support certain types of loads, such as sheets of plywood or drywall. The secondary position is between a closed position and a fully open position. For example, when the tailgate 26 is in the secondary position, a load of drywall sheets can be supported on an upper edge 32 of the tailgate 26 and upper edges of the wheel wells 34 of the vehicle 10.

With reference now to FIGS. 3A to 4B, a tailgate securing assembly 50 includes a strap 54 and a fastener 58. In FIGS. 3A to 4B, the fastener 58 is in an engaged position with the strap 54. The tailgate securing assembly 50, with the fastener 58 in the engaged position, secures the tailgate 26 by keeping the tailgate 26 pivotably coupled to the cargo bed 14.

In this example, the tailgate 26 includes a pivot pin 62 that extends laterally outward relative to a centerline of the vehicle 10. Positioning the pivot pin 62 within a cupped member 66 pivotably couples the tailgate 26 to the vehicle 10. The pivot pin 62 can rotate within the cupped member 66 about the pivot axis A when the tailgate 26 is moved between the closed position and open positions.

In this example, the cupped member 66 extends from a bracket 70 that is secured directly to the sidewall 18. The cupped member 66 includes an opening 74 that permits the pivot pin 62 to be moved radially into the cupped member 66 during assembly.

The pivot axis A extends through the pivot pin 62. The pivot pin 62 can rotate within the cupped member 66 when pivoting the tailgate 26 about the pivot axis A between the closed position and one of the open positions, such as the secondary position or fully open position.

The tailgate securing assembly 50 covers the opening 74 to keeps the tailgate 26 pivotably coupled to the cargo bed 14 when the tailgate 26 is in the closed position and the open positions. That is, the tailgate securing assembly 50, here the strap 54, covers the opening 74 when the strap 54 is placed over the cupper member 66. The portion of the strap 54 covering the opening 74 prevents the pivot pin 62 from moving radially back through the opening 74.

From time to time, a user may wish to remove the tailgate 26. To remove the tailgate 26, the user can use a tool to disengages the fastener 58 from the strap 54 so that the strap 54 can be removed from the cupped member 66. After removing the strap 54, the pivot pin 62 can be moved radially outward through the opening 74. While an unauthorized individual could disengage the fastener 58, the process takes more time than if the unauthorized user were simply permitted to move the pivot pin 62 radially outward through the opening without first disengaging the fastener 58. The added time required to remove the tailgate 26 may be sufficient to deter the unauthorized user from attempting such a removal of the tailgate.

Figure 5A:
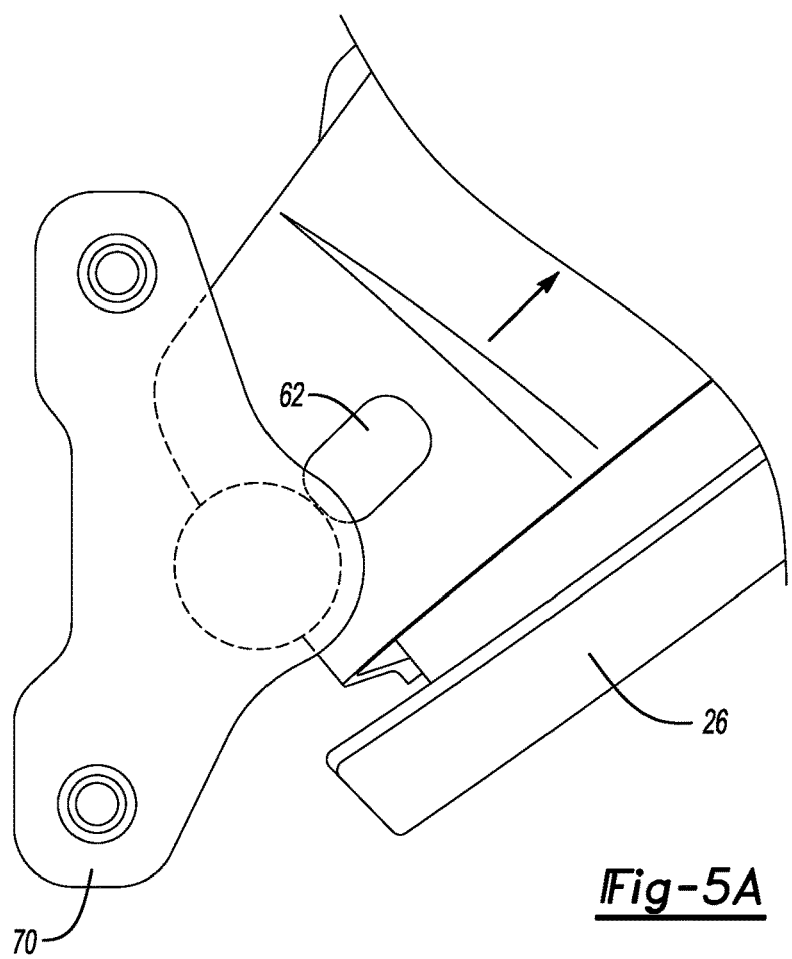
FIG. 5A illustrates a side view of portions of the tailgate of FIG. 3A and 3B in a fully open position along with the securing assembly.
Figure 5A:
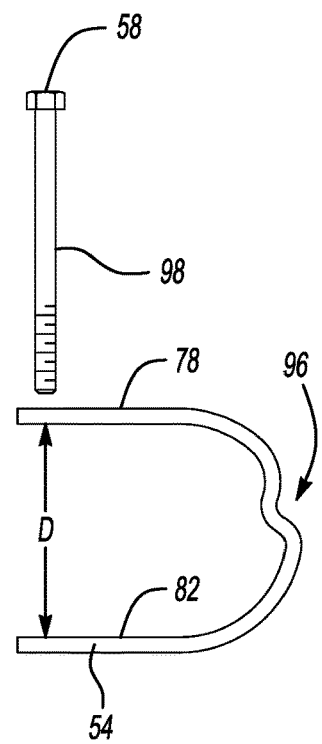
Figure 5B:
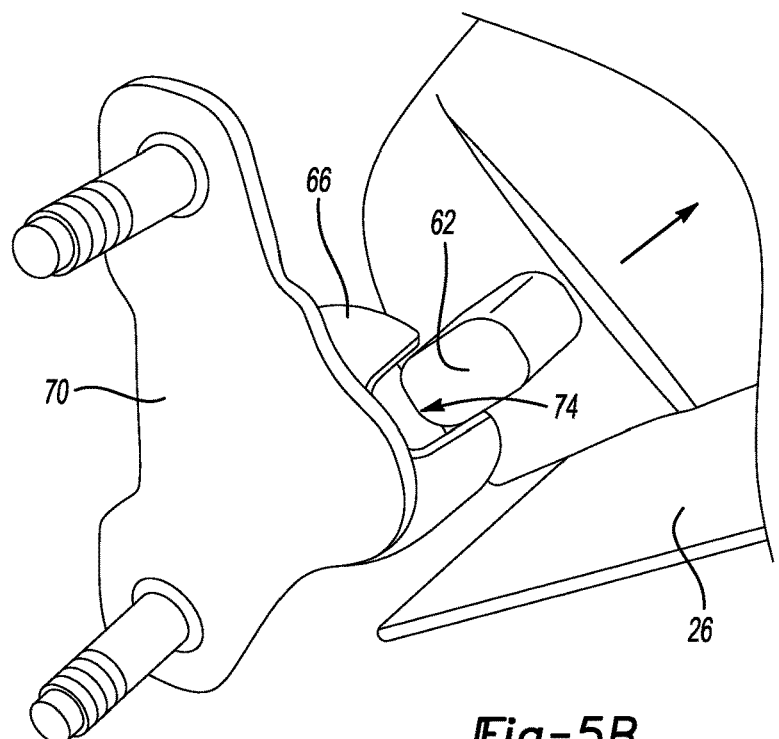
FIG. 5B illustrates a perspective view of the portions of the tailgate and the securing assembly shown in FIG. 5A.
Figure 5B:
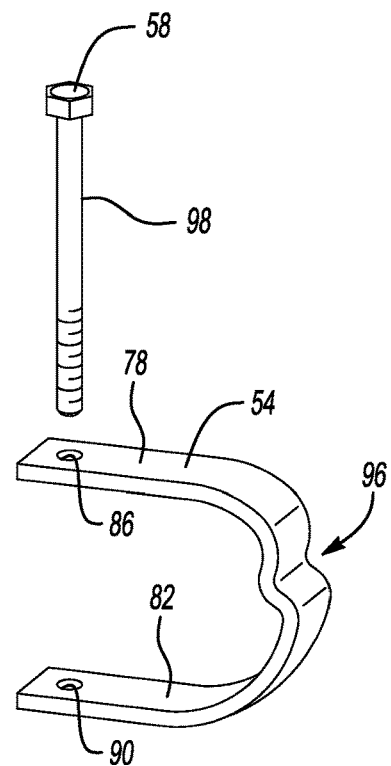

Moving the pivot pin 62 through the opening 74 decouples the tailgate 26 from the cargo bed 14 on the driver side. A cupped member on the passenger side (not shown) may not include a slot. After moving the tailgate to the position of FIGS. 5A and 5B, a pin member of the tailgate 26 on the passenger side can be withdrawn from a cup of a bracket of the passenger side.

The strap 54 prevents the tailgate 26 from dislodging when the tailgate 26 is, in particular, in the secondary position. The strap 54 can be from three to five millimeters thick. In the specific example, the strap 54 is four millimeters thick.

The strap 54, which is a U-shaped strap in this example, includes a first leg 78 and a second leg 82. The first leg 78 includes a first aperture 86, and the second leg 82 includes a second aperture 90. The first aperture 86 is a nonthreaded aperture. The second aperture 90 is a threaded aperture. In other examples, the second aperture 90 within the strap 54 could be non-threaded with the threads provided by a weld-nut that is secured to the strap 54. The first aperture 86, the second aperture 90, or both could be extruded holes in the strap.

When the fastener 58 is in the engaged position with the strap 54 as shown in FIG. 3A to 4B, the fastener 58 extends through the first aperture 86 to threadably engage the second aperture 90. Transitioning the fastener 58 to the engaged position with the strap 54 involves, in this example, inserting the fastener 58 through the first aperture 86 to threadably engage the second aperture 90.

The first leg 78 is spaced a distance from the second leg 82 when the fastener 58 is in the engaged position such that no portion of the first leg 78 contacts the second leg 82 when the fastener 58 is in the engaged position.

Prior to placing the cupped member 66 within the strap 54, the first leg 78 is spaced a distance D from the second leg 82. An outer diameter of the cupped member 66 is slightly larger than the distance D. Placing the strap 54 over the cupped member 66 moves the first leg 78 and second leg 82 further away from each other. The strap 54 is press-fit about the cupped member 66, which can help to hold the strap 54 on the cupped member 66.

The strap 54 includes an anti-rotation feature 96 which, in this example, is a radially depressed area of the strap 54 that includes a portion extending radially inward into the opening 74 when the strap 54 receives the cupped member 66. The anti-rotation feature 96 helps to inhibits rotating of the strap 54 relative to the cupped member 66 as the tailgate 26 is moved back and forth between the closed position and the open positions.

The anti-rotation feature 96 also helps to ensures that the positioning of the strap 54 is repeatable when the strap 54 is placed about the cupped member 66. That is, the anti-rotation feature 96 can be configured to align the strap 54 relative to the cupped member 66, especially circumferentially aligning the strap 54 relative to the cupped member 66. The repeatable positioning can facilitate assembly of the securing assembly 50 because, among other things, the positioning of the first aperture 86 is consistent and in a position appropriate for receiving the fastener 58 when the fastener 58 is inserted through the first aperture 86 to threadably engage the second aperture 90. The location of the first aperture 86 is repeatable during assembly due to the anti-rotation feature 96, and the press fitting of the strap 54 about the cupped member 66.

When the securing assembly 50 is disposed about the cupped member 66, an attempted removal of the tailgate 26 would be inhibited because the strap 54 blocks the pivot pin 62 from moving radially outward through the opening 74. When the vehicle 10 is being operated with the tailgate 26 in an open position, such as the secondary position, the strap 54 also blocks the pivot pin 62 from moving radially outward through the opening 74 when the vehicle 10 is operating over rough terrain.

The first leg 78 is spaced from the second leg 82 when the strap 54 is placed over the cupped member 66. The fastener 58 spans from the first leg 78 to the second leg 82 when the fastener 58 is in the engaged position such that the fastener 58 together with the strap 54 extend circumferentially continuously about the pivot axis A and the cupped member 66. The strap 54 circumferentially extends about a majority of the perimeter. However, a substantial portion of the circumferential perimeter is circumferentially surrounded by the fastener 58.

The strap 54 and the fastener 58 together prevent the pivot pin 62 from being withdrawn through the opening 74. If the pivot pin 62 moves radially outward against the portion of the strap 54 covering the opening 74, a shaft 98 of the fastener 58 directly contacts the cupped member 66 to prevent the pivot pin 62 from moving the strap 54 enough to permit the pivot pin 62 to move through the opening 74.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An assembly for securing a tailgate to a cargo bed, the assembly comprising:
    a strap having a first leg spaced from a second leg; and
    a fastener moveable to an engaged position with the strap, the fastener in the engaged position extending through a first aperture in the first leg to threadably engage a second aperture in the second leg, wherein, when the fastener is in the engaged position, the fastener and the strap are configured to secure a tailgate to a cargo bed, wherein the strap is a U-shaped strap.

2. The assembly of claim 1, wherein the tailgate pivots about a pivot axis between a closed position and an open position relative to the cargo bed, the strap and the fastener together extending circumferentially continuously about the pivot axis when the fastener is in the engaged position.

3. The assembly of claim 1, further comprising a pivot pin held within a cupped member to pivotably couple the tailgate to the cargo bed, the pivot pin rotating about a pivot axis within the cupped member when the tailgate pivots back and forth between an open position and a closed position, the strap and the fastener circumferentially surrounding the cupped member to secure the tailgate to the cargo bed.

4. The assembly of claim 3, wherein the cupped member includes an opening, the pivot pin moved radially inward relative to the pivot axis through the opening to position the pivot pin within the cupped member.

5. The assembly of claim 4, wherein, when the fastener is in the engaged position, a shaft of the fastener is configured to directly contact the cupped member.

6. The assembly of claim 4, wherein the first leg is spaced a distance from the second leg, wherein a diameter of the cupped member is greater than the distance such that the first leg is moved away from the second leg when the strap is placed over the cupped member.

7. The assembly of claim 4, wherein the cupped member extends from a bracket that is directly secured to a sidewall of the cargo bed.

8. An assembly for securing a tailgate to a cargo bed, the assembly comprising:
    a strap having a first leg spaced from a second leg; and
    a fastener moveable to an engaged position with the strap, the fastener in the engaged position extending through a first aperture in the first leg to threadably engage a second aperture in the second leg, wherein, when the fastener is in the engaged position, the fastener and the strap are configured to secure a tailgate to a cargo bed,
    wherein the tailgate pivots about a pivot axis between a closed position and an open position relative to the cargo bed, the strap and the fastener together extending circumferentially continuously about the pivot axis when the fastener is in the engaged position,
    wherein the first leg and the second leg are spaced a distance from each other when the fastener is in the engaged position such that no portion of the first leg contacts the second leg when the fastener is in the engaged position.

9. The assembly of claim 8, wherein the fastener spans across the distance from the first leg to the second leg when the fastener is in the engaged position.

10. An assembly for securing a tailgate to a cargo bed, the assembly comprising:
    a strap having a first leg spaced from a second leg;
    a fastener moveable to an engaged position with the strap, the fastener in the engaged position extending through a first aperture in the first leg to threadably engage a second aperture in the second leg, wherein, when the fastener is in the engaged position, the fastener and the strap are configured to secure a tailgate to a cargo bed; and
    a pivot pin held within a cupped member to pivotably couple the tailgate to the cargo bed, the pivot pin rotating within the cupped member when the tailgate pivots back and forth between an open position and a closed position, the strap and the fastener circumferentially surrounding the cupped member to secure the tailgate to the cargo bed,
    wherein the cupped member includes an opening, the pivot pin moved radially inward relative to the pivot axis through the opening to position the pivot pin within the cupped member, wherein the strap includes an anti-rotation feature that extends radially inward into a portion of the opening, the anti-rotation feature configured to limit rotation of the strap about the pivot axis.

\* \* \* \* \*